Sept. 3, 1946. J. MORKOSKI 2,407,173
AGRICULTURAL IMPLEMENT
Original Filed June 28, 1943 2 Sheets-Sheet 1
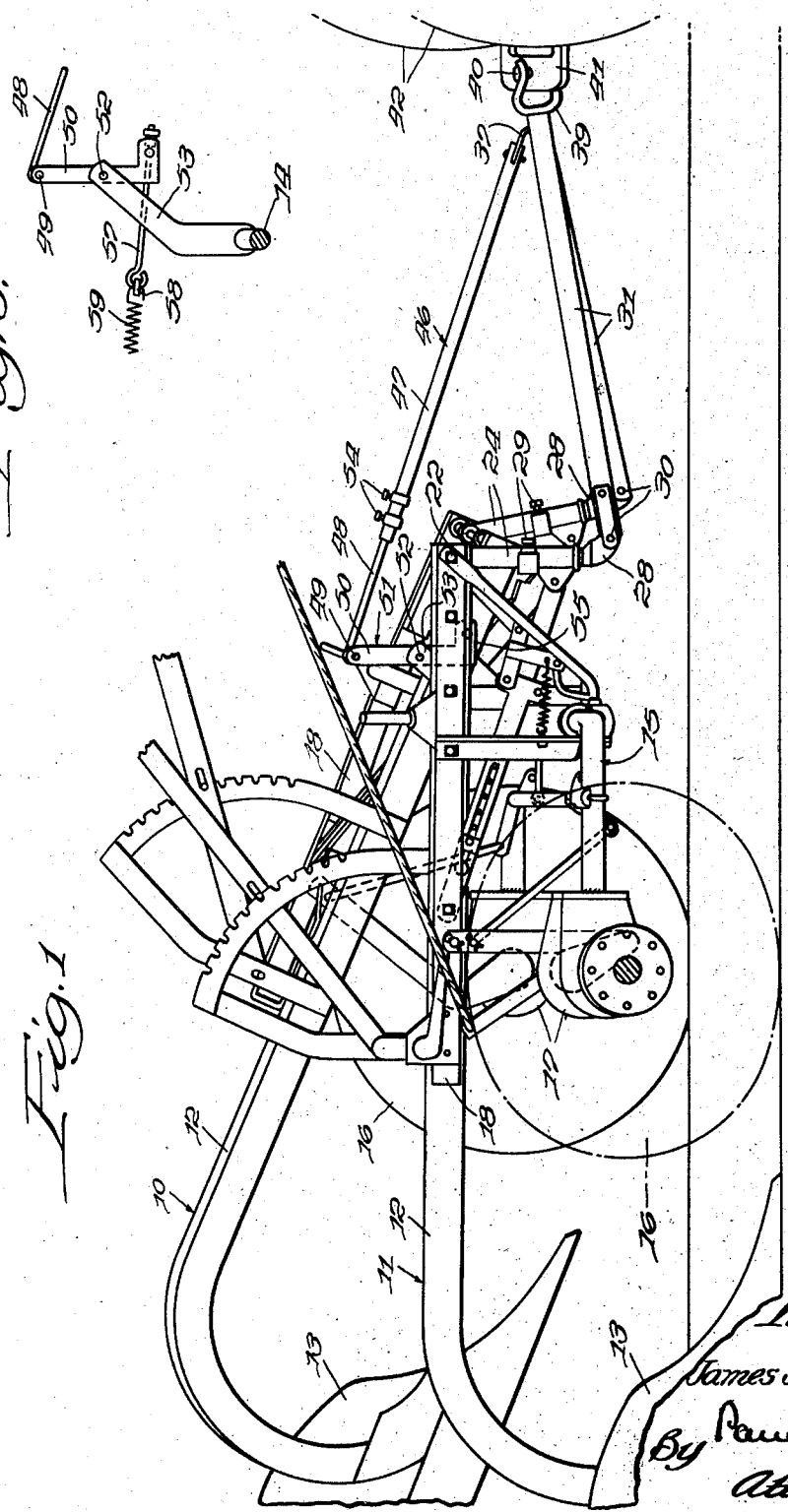
Inventor:
James Morkoski.
By Paul O. Pippel
Attorney.

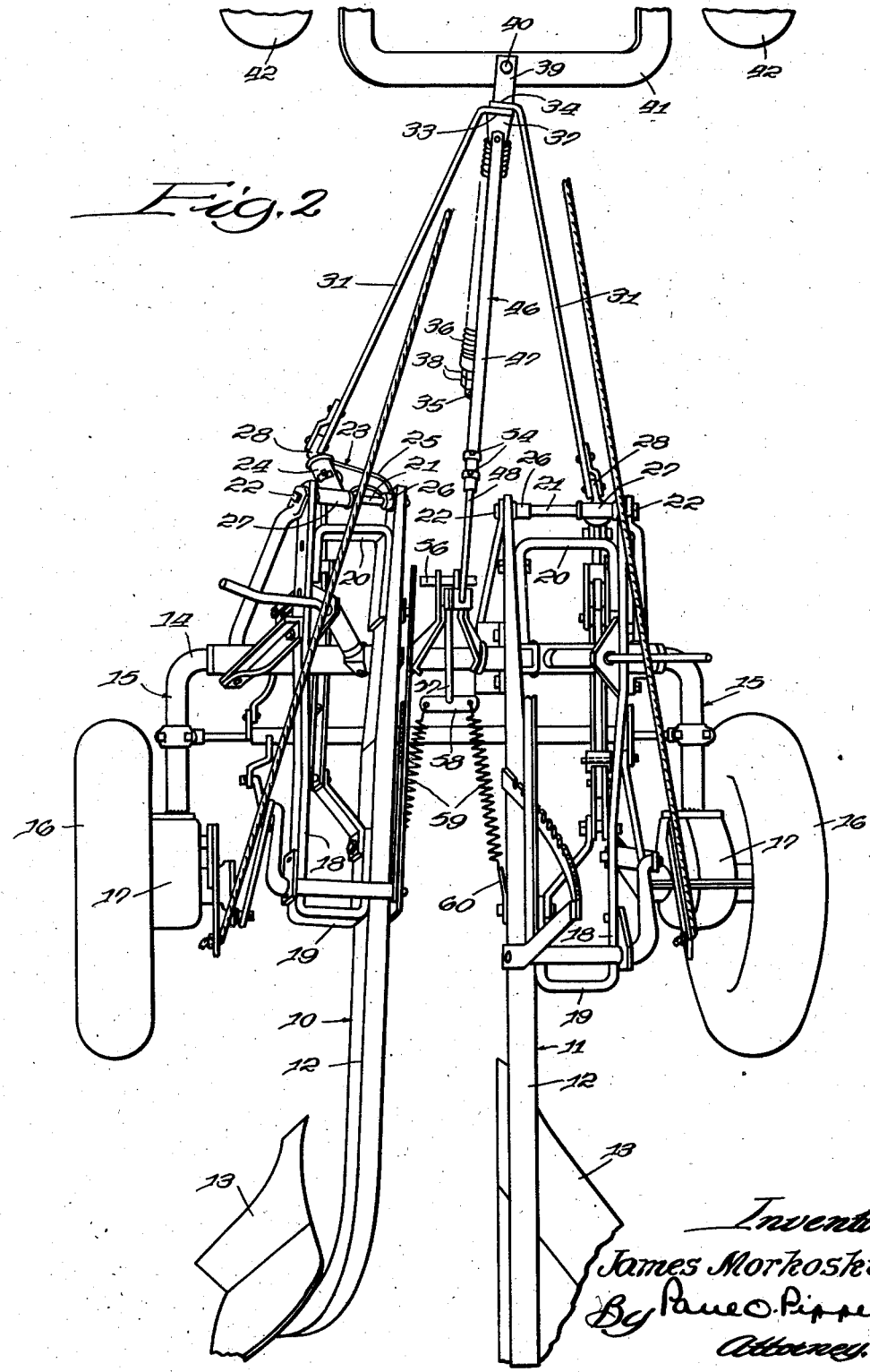

Patented Sept. 3, 1946

2,407,173

UNITED STATES PATENT OFFICE 2,407,173

AGRICULTURAL IMPLEMENT

James Morkoski, Canton, Ill., assignor to International Harvester Company, a corporation of New Jersey Original application June 28, 1943, Serial No. 492,476. Divided and this application November 29, 1944, Serial No. 565,623

4 Claims. (Cl. 97—47)

This invention relates to agricultural implements, and more particularly to implements of the trailing type adapted for attachment to a tractor or other vehicle to be drawn therebehind. More specifically the invention is concerned with a hitch structure for plows and the like.

The present invention will be described as applied to a trail-behind two-way plow. However, it should be understood that with slight modifications the invention may be adapted for use with other implements. The invention is particularly applicable to plows such as that shown and described in pending United States application of John R. Orelind and James Morkoski, Serial No. 492,476, filed June 28, 1943, of which this application is a division. In a plow of this type, the beams are generally supported between front and rear ends thereof by laterally spaced wheels, and the plow is pivotally connected to a relatively long hitch frame which, in turn, is pivotally connected to the tractor by which the implement is drawn.

In a plow of the type described, the line of draft is a theoretical straight line extending from the center of gravity of the working plow bottom to the point of attachment of the implement to the tractor. Since the point of attachment of the hitch frame to the implement must be slightly above this point in order to prevent the collection of trash near the ground, the rear of the plow has a tendency to rise out of the ground and the implement to pivot forwardly.

An object of the present invention is to provide means incorporated in the hitch and plow structure for overcoming the tendency of the implement to pivot forwardly.

Another object is to provide means which not only inhibit the forward pivoting of the plow and the consequent tendency of the working tools or plow bottoms to rise out of the ground, but which resiliently hold the plow bottom or bottoms to their work during operation, and also prevent forward tilting of the implement when backing up, particularly in transport position.

These and other objects will become clear from the following detailed description when read in conjunction with the accompanying drawings, wherein:

Figure 1 is a view in side elevation of a two-way plow embodying the principles of the present invention, attached to a tractor, and showing the left-hand plow bottom in raised position;

Figure 2 is a plan view of the plow shown in Figure 1; and

Figure 3 is a detail in side elevation of a part of the hitch structure.

Referring to the drawings, the two-way plow shown in the drawings includes a pair of plow units 10 and 11, each comprising a longitudinally extending beam 12 having mounted upon the rear end thereof a plow bottom 13. Beams 12 are mounted for rocking movement upon the transverse portion 14 of a crank axle having rearwardly extending arms 15 supporting ground wheels 16. Each wheel has associated therewith a power lift mechanism 17 by means of which power from the ground wheel is utilized to raise and lower each plow beam 12 independently.

Generally parallel to each beam and extending longitudinally thereof for a considerable distance is a bracket 18 having an inwardly bent end 19 attached to the outer face of the beam. The forward end of the bracket 18 is made fast to the beam by a U-shaped member 20 affixed to the bracket and the beam. The free forward ends of beam 12 and bracket 18 are connected by a bolt 21 having nuts 22 upon the outer ends thereof. Depending from bolt 21 and pivotally mounted thereupon is a member 23 comprising a sleeve portion 24 and a bracing arm 25 provided with bosses 26 and 27 having openings for the reception of bolt 21, and abutting beam 12 and bracket 18, respectively, to prevent lateral movement of member 23. Sleeve 24 receives for sliding movement therein a shaft 28, which may be telescoped with respect to the sleeve to vary the effective length of member 23, and may be held in a number of adjusted positions by a set screw 29.

Members 23 have independent forward and rearward pivotal movement to permit the working plow bottom to assume its proper plowing position with respect to the rear wheels of the tractor, depending upon the direction of travel of the plow across the field, and are actuated by a mechanism which, along with the details of construction of the plow units, forms no part of the present invention. For operational and constructional details of the plow reference may be had to pending United States application Serial No. 492,476, referred to hereinabove.

The lower end of each shaft 28 is flattened and apertured to receive a pin 30, upon which is mounted for vertical pivotal movement the bifurcated rear end of a hitch member 31, forming one arm of a hitch frame generally indicated at 32. Hitch members 31 converge forwardly and are provided at their forward ends with bent portions 33 and 34, overlapping and having registering openings to receive for sliding movement a rearwardly extending rod 35, surrounded by a spring 36. The forward end of spring 36 abuts against a clevis 37 and the rear end against nuts 38 by which the tension upon the spring may be varied. The forwardly projecting end of rod 35 is affixed to the closed end of a clevis 39 provided with a pin 40 for attachment to the draw-bar 41 of a tractor having rear wheels 42. Spring 36 imparts flexibility to the hitch connection of the implement to the tractor.

As pointed out before, a plow of the type described has a tendency to pivot forwardly about its connection to the transverse portion 14 of the crank axle. To overcome this tendency, mechanism has been provided including a hitch member 46, adjustable in length, and comprising a sleeve 47 attached to the clevis 37 on the forward end of the hitch frame 32, and a shaft 48 pivoted on a pin 49 in one arm 50 of a bell-crank 51 (see Figures 1 and 3). The bell-crank is pivoted upon a pin 52 mounted in a bracket 53 affixed to the transverse portion 14 of the crankaxle between the plow units 10 and 11. Hitch member 46 is made rigid by set-screws 54. The other arm 55 of the bell-crank is provided with forwardly bent lugs adapted to receive a pin 56 for pivotally mounting the threaded end of an eye bolt 57. Eye bolt 57 extends rearwardly and is connected to a cross-piece 58 extending laterally and having openings in each end for the attachment thereto of springs 59, the other ends of which are attached to lugs 60 secured to the sides of beams 12. It will be noted that clockwise movement of the bell-crank 51 is limited by the projecting ends of pin 56, which abut against the forward edge of bracket 53. By loosening set-screws 54, the effective length of hitch member 46 may be varied. When the implement is in the plowing position shown in Figures 1 and 2, and forward draft is exerted thereupon, hitch member 46, through bell-crank 51 and springs 59, exerts a yielding downward pressure against the rear end of the implement to hold it in the ground. When the plow elements are lifted to raised position for transport, the effective length of member 46 may be shortened to prevent the rear end of the implement from dropping downwardly. When it is desired to back up the plow in transport position, hitch member 46 functions to prevent forward tilting of the implement.

Having described the invention, it should be understood that modifications may be made therein without departing from the spirit thereof or the scope of the appended claims.

What is claimed is:

1. In an agricultural implement adapted for attachment to a tractor, in combination, supporting wheels on the implement, hitch means on the implement, a member pivoted on the implement for longitudinal rocking movement, means adjustable in length rigidly connecting said hitch means and said member for rocking movement therewith, and means biasing said member to forward rocking movement.

2. In an agricultural implement adapted for attachment to a tractor, in combination, supporting wheels on the implement, hitch means on the implement, a member pivoted on the implement for longitudinal rocking movement, means connecting said hitch means and said member for rocking movement therewith, means biasing said member to forward rocking movement, and stop means limiting forward rocking movement of said member.

3. In an agricultural implement adapted for attachment to a tractor, in combination, supporting wheels on the implement, hitch means on the implement, a bell crank pivoted on the implement for longitudinal rocking movement and having an upwardly extending arm and a downwardly extending arm, a member adjustable in length connecting said hitch means and the upper arm of said crank for rocking movement therewith, and resilient means connecting the lower arm of said crank and said implement arranged to urge said member forwardly.

4. In an agricultural implement adapted for attachment to a tractor, in combination, supporting wheels on the implement, hitch means on the implement, a bell crank pivoted on the implement for longitudinally rocking movement and having an upwardly extending arm and a downwardly extending arm, a member adjustable in length connecting said hitch means and the upper arm of said crank for rocking movement therewith, resilient means connecting the lower arm of said crank and said implement arranged to urge said member forwardly, and stop means arranged to engage said lower arm to limit forward movement of said member.

JAMES MORKOSKI.